United States Patent [19]

Keckler et al.

[11] Patent Number: 4,736,345

[45] Date of Patent: Apr. 5, 1988

[54] COMPLIANT SPACER FOR A MARINE SEISMIC STREAMER

[75] Inventors: William G. Keckler; Robert G. Zachariadis, both of Dallas; Gary T. Griffin, Millican, all of Tex.

[73] Assignee: Mobil Oil Corporation, New York, N.Y.

[21] Appl. No.: 31,058

[22] Filed: Mar. 27, 1987

[51] Int. Cl.[4] .............................................. G01V 1/38
[52] U.S. Cl. ...................................... 367/20; 367/154
[58] Field of Search .................. 367/15, 20, 106, 130, 367/154, 162, 165, 166, 173, 176; 181/110, 402; 174/101.5

[56] References Cited

U.S. PATENT DOCUMENTS

| 3,299,391 | 1/1967 | Herrmann et al. |
| 3,319,734 | 5/1967 | Pavey, Jr. |
| 3,371,739 | 3/1968 | Pearson |
| 3,506,085 | 4/1970 | Loper |
| 3,518,677 | 6/1970 | Florian |
| 3,696,329 | 10/1972 | Hazelhurst |
| 4,146,870 | 3/1979 | Ruehle |
| 4,160,299 | 7/1979 | McGough ........................... 367/154 |
| 4,204,188 | 5/1980 | Weichart et al. |
| 4,296,481 | 10/1981 | Weiss ..................................... 367/20 |
| 4,491,939 | 1/1985 | Carpenter ............................ 367/20 |
| 4,538,250 | 8/1985 | De Metz et al. ................... 367/130 |
| 4,581,724 | 4/1986 | Zachariadis |
| 4,641,288 | 2/1987 | McGowan et al. |

Primary Examiner—Charles T. Jordan
Assistant Examiner—John N. Eldred
Attorney, Agent, or Firm—Alexander J. McKillop; Michael G. Gilman; George W. Hager Jr.

[57] ABSTRACT

A spacer for a marine seismic streamer employs a compliant material that mechanically isolates the spacer from the hosewall and strain members of the streamer and also allows the flow of fill fluid therethrough so as to prevent pressure pulse build-up in such fluid during towing of the streamer along a line of exploration.

9 Claims, 2 Drawing Sheets

COMPLIANT SPACER FOR A MARINE SEISMIC STREAMER

BACKGROUND OF THE INVENTION

This invention relates to marine seismic exploration and, more particularly, to a marine seismic streamer configured to reduce tow noise on the recorded seismic data by employing compliant type spacers along the length of the streamer.

In conducting a marine seismic survey, a seismic energy source is employed by an exploration vessel to generate a seismic signal, referred to as a seismic pressure wave, which is transmitted through the water layer into the subsurface formations. A portion of the signal is reflected from the subsurface reflecting interfaces back to the water layer where it is received by a seismic streamer being towed behind the exploration vessel. The streamer is comprised of a plurality of hydrophones which generate electrical signals in response to the received seismic signals. The hydrophones are spread along the length of the streamer and are electrically connected through the streamer to seismic recording instruments on board the exploration vessel. Such a machine seismic survey may be typically carried out with the exploration systems of the type described in U.S. Pat. No. 4,146,870 to W. H. Ruehle and U.S. Pat. No. 4,581,724 to R. G. Zachariadis wherein a seismic energy source and seismic streamer are towed through the water along a line of exploration.

In seismic marine operations numerous problems are encountered in the recording of seismic data that are not encountered during land operations. A primary one of these problems is tow noise generated by both the movement of the vessel and the streamer through the water as they traverse along the line of exploration.

It is, therefore, a primary object of the present invention to provide for a seismic streamer employing compliant-type spacers that serve to minimize such noise as it travels along the seismic streamer thereby providing seismic signals with less distortion, more dynamic range, and broader frequency spectrum than that provided by conventional seismic streamers. Seismic signals with lower distortion and broader dynamic range will resolve thin beds and stratigraphic traps more readily. Reducing noise will permit detection of deeper events and better resolution of events at all levels.

SUMMARY OF THE INVENTION

The present invention is directed to a spacer for use in a fluid filled marine seismic streamer having strain members passing therethrough. An inner ring provides structural support for the streamer. An intermediate ring provides support for passage of the streamer strain members. An outer ring provides shock and vibration isolation to the spacer.

The outer ring is comprised of a compliant material that has a porosity to permit the flow of fill fluid therethrough. It also has a cross-sectional area that minimizes pressure wave buildup within the fill fluid. Preferably, the compliant material is an open-cell foam with a porosity in the range of 20 to 40 PPI.

DESCRIPTION OF THE PREFERRED EMBODIMENT

Figure 1:
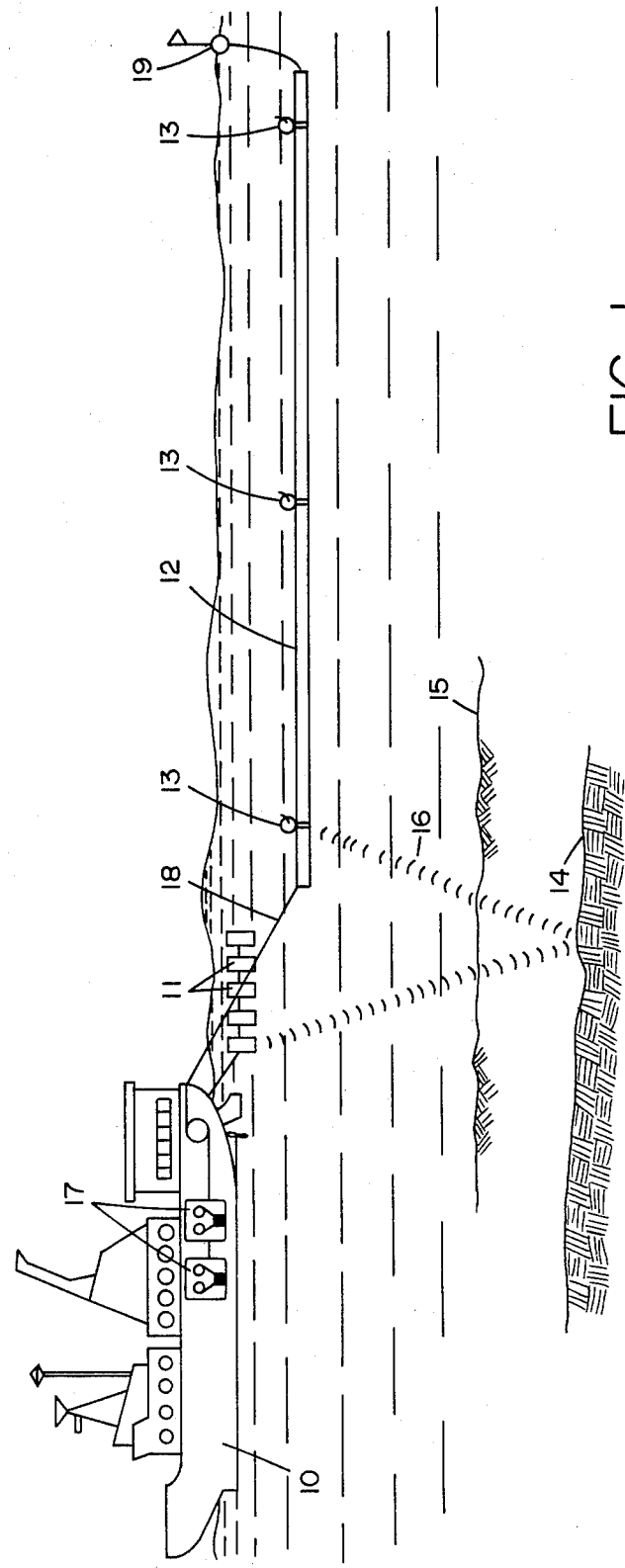
FIG. 1 illustrates a marine seismic exploration system with which the compliant spacer of the present invention may be utilized.

Referring to FIG. 1, there will be described a marine seismic exploration system with which the marine seismic streamer of the present invention may be employed. The seismic marine exploration vessel 10 traverses a line of exploration. The vessel 10 tows one or more seismic energy sources 11 and a seismic streamer 12 employing a plurality of hydrophones spaced along the length of the streamer. Seismic energy is generated in the water by the source 11 and reflections 16 of such energy from subsurface formations, such as illustrated at 14 below the water bottom 15, as detected by the plurality of hydrophones along the streamer 12 as seismic reflection signals. These seismic signals are transferred to data recording and processing equipment 17 on the vessel 10 by way of electrical wiring through streamer 12 and up streamer tow cable 18. FIG. 1 does not show conventional or state-of-the-art mechanical features of a steamer such as strain member, electrical cables, spacers, or even the hydrophones themselves. These features are clearly disclosed in numerous U.S. patents, for example, U.S. Pat. Nos. 3,299,397 and 3,319,734 to G. M. Pavey, Jr. et al.; 3,371,739 to R. H. Pearson and 4,204,188 to H. Weichart et al. The streamer 12 may additionally be provided with one or more depth control devices 13 and a tail bouy 19. A typical seismic energy source 11 used in marine seismic exploration may comprise one or more air guns of the type described in U.S. Pat. No. 3,506,085 to G. B. Loper. A typical data recording and processing system 17 is the Texas Instruments Model DFS-V Ditigal Field Recorder.

Typically, a plurality of spacers are positioned along the length of the seismic streamer for supporting the cylindrical outer hose of the seismic streamer. Such spacers are of cylindrical shape as shown in U.S. Pat. Nos. 3,518,677 to Florian and 3,696,329 to Hazelhurst.

Generally, the spacers are of a thermoplastic material with large cross-section. They are soldered to the strain members and make a force fit with the streamer hosewall. This provides a tightly coupled system in which a vibration in one component is transmitted to other components, thereby increasing steamer tow noise. It is therefore a specific feature of the present invention to provide a new streamer spacer that minimizes such tow noise through a compliant type spacer structure that does not transmit streamer vibration.

Figure 3:
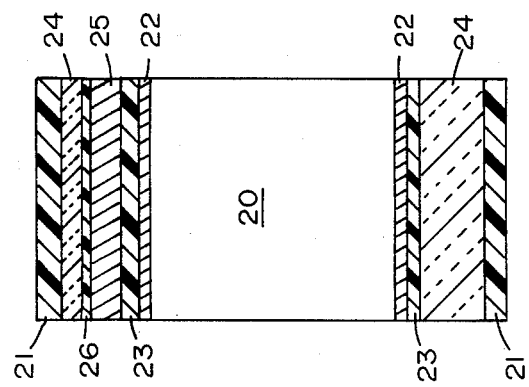
FIG. 3 is a cross-sectional view of the compliant spacer of FIG. 2 taken along lines A—A of FIG. 2.
Figure 2:
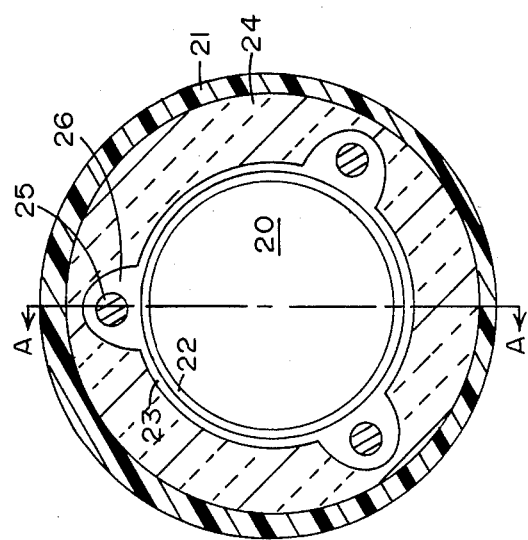
FIG. 2 is an end view, partially in cross-section, of the compliant spacer mount of the present invention positioned inside a seismic marine streamer.

In FIGS. 2–3 there is shown the compliant streamer spacer 20 of the present invention positioned under the hosewall 21 of the seismic streamer. Spacer 20 is of cylindrical shape and is comprised of an inner ring 22, an intermediate ring 23, and an outer ring 24. Inner ring 22 provides structural strength to the spacer and may be made of a metal, a hard plastic or any other structurally sound material. Intermediate ring 23 has a plurality of tabs 25 with cylindrical passageways 26 running its length for supporting the passage of the streamer strain members through the spacer. Ring 23 may be of a molded polyurethane material, for example, bonded to the outer surface of inner ring 22 for structural stability. Outer ring 24 is of a compliant material, such as open-cell foam for example, and is formed to fit about intermediate ring 23. Outer ring 24 may also be bonded to the outer surface of intermediate ring 23. With this configuration, spacer 20 will have minimal hydroacoustic effect on the seismic measurements being made by the hydrophones of the marine seismic streamer. For example, the intermediate ring 23 serves to isolate the spacer from strain member vibration and extension waves in the hosewall of the streamer. The outer ring forms a compliant coupling between the spacer and the hosewall of the streamer and also maintains the spacer in a concentric position within the hosewall of the streamer. It allows the free flow of the streamer fill fluid therethrough and its relatively small cross-section minimizes the generation of pressure waves in the fill fluid under longitudinal vibration of the streamer.

Preferably the compliant material of ring 24 such as open-cell foam, has a porosity in the range of 20 to 40 PPI for a typical oil-filled streamer. Such foam can be supplied by Foam-Fab of Mansfield, Mass. or Wilshire Foam of Dallas, Tex. In one form such open cell foam is a thermoplastic material.

It can therefore be seen that the compliant spacer of the present invention provides for shock and vibration isolation along the seismic streamer while at the same time damping any pressure pulse build up in the fluid fill from the vibration motion of the streamer. Even though one embodiment of the invention has been described herein, it will be apparent to those skilled in the art that various changes and modifications may be made without departing from the spirit and scope of the invention as set forth in the appended claims. Any such changes and modifications coming within the scope of such appended claims are intended to be included herein.

We claim:

1. A spacer for use in a fluid filled marine seismic streamer having strain members passing therethrough, comprising:
   (a) an inner ring which provides structural support for said streamer,
   (b) an intermediate ring which provides support for the passage of streamer strain members, and
   (c) an outer ring which provides shock and vibration isolation to said spacer.
2. The spacer of claim 1 wherein said outer ring employs a compliant material.
3. The spacer of claim 2 wherein said compliant material has a porosity to permit the flow of streamer fill fluid therethrough.
4. The spacer of claim 3 wherein the cross-sectional area of said complaint material is such that pressure wave buildup within said fill fluid is minimized.
5. The spacer of claim 3 wherein said compliant material is an open-cell foam.
6. The spacer of claim 5 wherein the porosity of said open-cell foam is at least 20 PPI.
7. The spacer of claim 5 wherein the porosity of said open-cell foam is in the range of 20 to 40 PPI.
8. The spacer of claim 5 wherein said open-cell foam is a thermoplastic.
9. A spacer for a fluid filled marine seismic streamer having strain members passing through its length comprising:
   (a) a first ring of open-cell foam material positioned within the hosewall of said marine seismic streamer for providing a compliant coupling for said spacer with said hosewall and free flow of said fill fluid therethrough,
   (b) a second ring of polyurethane material positioned within said first ring and providing isolation of said spacer from strain member vibration, and
   (c) a third ring of aluminum material positioned within said second ring for providing structural support for second ring.

* * * * *